Feb. 13, 1951 W. R. HAMMOCK 2,541,920
FISHING HOOK AND LINE CARRIER
Filed June 14, 1948
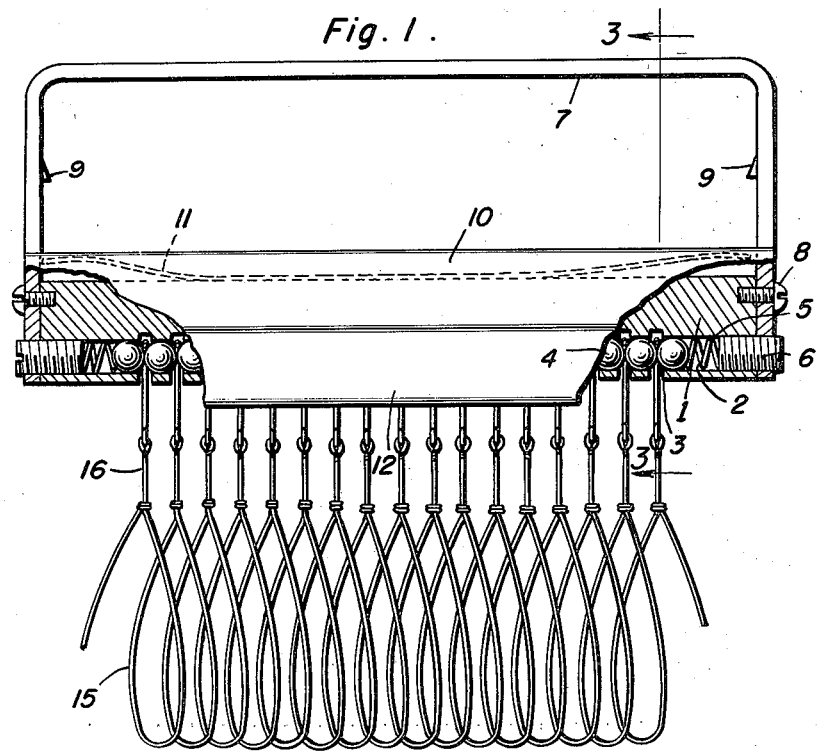
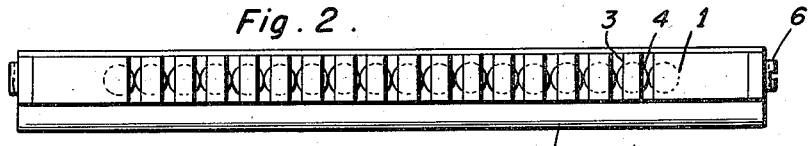
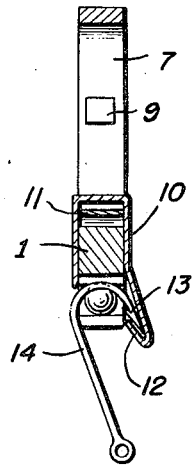
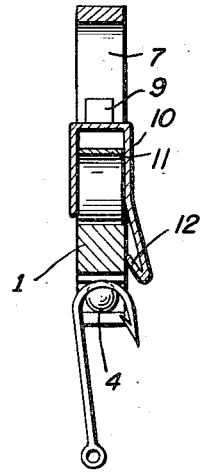
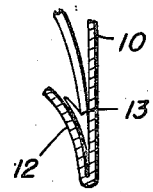
Walter R. Hammock
INVENTOR.

Patented Feb. 13, 1951

2,541,920

UNITED STATES PATENT OFFICE 2,541,920

FISHING HOOK AND LINE CARRIER

Walter R. Hammock, Stillwater, Okla.

Application June 14, 1948, Serial No. 32,812

5 Claims. (Cl. 43—54.5)

1

The present invention relates to new and useful improvements in devices for use in connection with multiple hook lines, such as trot lines.

An important object of the invention is to provide means for securing the hooks quickly and in an orderly fashion in a hook and line carrying device thereby holding the line in regular loops free from tangles, to provide a handle for conveniently carrying the device and to provide latch means to hold the hooks firmly in place and to prevent damage to the points and barbs of the hooks as well as to protect the fisherman from injury.

A further object of the invention is to provide means for automatically releasing the hooks in proper sequence as the line is put in the water.

A still further object is to provide a device of this character which is of simple and practical construction, efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view with parts broken away and shown in section, and a multiple hook line carried thereby.

Figure 2 is a bottom plan view, the line being omitted.

Figure 3 is a transverse sectional view taken substantially on a line 3—3 of Figure 1 and showing the shield in position for protecting the point and barb of the hook.

Figure 4 is a similar view showing the shield released from the hook, and

Figure 5 is an enlarged fragmentary sectional view showing the V-shaped lip for protecting points and the barbs of the hooks.

Referring now to the drawings in detail wherein for the purpose of illustration I have disclosed a preferred embodiment of this invention, the device consists of a body 1 with a bore 2 drilled longitudinally in its lower portion and slots 3 cut transversely in its lower edge and intersecting the bore 2.

A number of balls 4 are held in place in the bore and in contact with each other by compression springs 5 and adjustable screws or plugs 6 threaded in the ends of the bore.

A U-shaped handle 7 is secured to the ends of body 1 by the plugs 6 and by additional screws 8. Lugs 9 project inwardly from the sides of the handle and against which the ends of a hook shield 10 are held by a flat spring 11.

The shield 10 is of channel shaped construction placed over body 1 with one edge of the shield formed with a V-shaped lip 12 for receiving the points 13 of hooks 14.

In the operation of the device the fish hooks 14 attached to line 15 through leaders 16 are inserted in the slots 3, one at a time, and enough force is exerted thereon to spread the adjacent balls 4 apart against the compression of springs 5 thus allowing the fish hooks to pass between the balls and to rest in the slots behind them.

The compression of the spring 5 forcing the balls 4 together is sufficient to hold the hooks in place during this stringing operation.

To insure that the hooks remain firmly in place during handling, transportation and storage, the hook shield 10 and spring 11 are provided. Hook shield 10 is made from a sheet of aluminum or other similar soft rustproof material and is formed in such a manner as to be free to slide vertically on body 1 and yet fit closely enough to give firm support to the hooks when in a latched position.

The sides of hook shield 10 extend over handle 7 at each end thereby assuring proper alignment of hook shield 10 even in the raised or unlatched position. Spring 11 which is under tension at all times and is the same width as handle 7 and is in effect enclosed by body 1, handle 7 and hook shield 10 so that it cannot become dislocated, therefore it needs no other method of fastening. The lower end of hook shield 10 is formed to provide a V lip to accommodate the points of the hooks when in the latched position.

When hooks are being inserted or removed from the slots, hook shield is always in the raised or unlatched position. In this position as shown in Figure 4 the top of hook shield 10 rests against projections 9 and on handle 7, being held in this position by the tension of spring 11. When it is desired to latch the hooks in position for handling, transporting and storage, hook shield 10 is forced downward against the tension of spring 11 at the same time holding the device in a flat position or nearly so with the pointed ends of the hooks all turned down. When the V-formed portion of hook shield 10 passes the points of the hooks the weight of the leader 16 and line 15 will cause the points of the hooks to drop into the V-shaped lip in hook-shield 10. Then by releasing the tension of spring 11 it will force hook shield 10 in the direction toward the handle until stopped by the wedging action of the hook points in the V-shaped lip in hook shield 10.

In this position the hooks are firmly supported and the entire assembly of hooks, leaders, and line can be handled in a rough and carefree manner without danger of dulling hooks, tangling hooks and line, or becoming injured from hooks.

When it is desired to remove the hooks the hook shield is released by forcing it down away from the handle until hook points are free from the V-shaped lip in hook shield. By holding the device in a flat position or nearly so with the hooks on the upper side the weight of the line and leaders will pull the points of the hooks away from the protector so that the spring will return it to its unlatched position. The hooks may then be removed by pulling them with sufficient force to spread the two adjacent balls apart allowing the hook to slip out between them.

The width of the slots 3 and the size of the balls 4 can be selected so that one style of this device will accommodate the entire range of sizes of hooks ordinarily used in trot-line fishing. The compression of the springs 5 can be regulated by screws or plugs 6 so that the ease with which hooks can be inserted and removed is at the control of the individual user. The shape of the hook shield can be designed to accommodate all of the common sizes of hooks and at the same time retain the feature of protecting the points and barbs of the hooks.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fish hook carrier comprising an elongated body having a longitudinal bore therein, a plurality of objects loosely positioned in the bore, spring means holding the objects in contact with each other, said body having slots in one edge intersecting the bore for receiving the bill portions of fish hooks snapped into a position behind the objects, and a shield carried by the body and movable into and out of position over the barbs of the hooks.

2. A fish hook carrier comprising an elongated body having a longitudinal bore therein, a plurality of objects loosely positioned in the bore, spring means holding the objects in contact with each other, said body having slots in one edge intersecting the bore for receiving the bill portions of fish hooks snapped into a position behind the objects, and a shield for the barbs of the hooks carried by the body, said shield comprising an inverted channel shaped member slidable vertically on the body, and an inwardly projecting lip on one lower edge of said shield receiving the points of the hooks.

3. A fish hook carrier comprising an elongated body having a longitudinal bore therein, a plurality of objects loosely positioned in the bore, spring means holding the objects in contact with each other, said body having slots in one edge intersecting the bore for receiving the bill portions of fish hooks snapped into a position behind the objects, and a shield for the barbs of the hooks carried by the body, said shield comprising an inverted channel shaped member slidable vertically on the body, and an inwardly projecting V-shaped lip on one lower edge of the shield in which the points of the hooks are received.

4. A fish hook carrier comprising an elongated body, spring biased objects loosely carried in the body in side by side relation, said body having slots in one edge for receiving the bill portions of fish hooks for snapping engagement behind the objects, an inverted U-shaped handle attached to the ends of the body, an inverted channel shaped shield slidable vertically on the body and including a trough on the inner side of one lower edge receiving the points of the hooks, and spring means holding the shield upwardly to maintain the hooks in the trough.

5. A fish hook carrier comprising an elongated body, spring biased objects loosely carried in the body in side by side relation, said body having slots in one edge for receiving the bill portions of fish hooks for snapping engagement behind the objects, an inverted U-shaped handle attached to the ends of the body, an inverted channel shaped shield slidable vertically on the body and including a resilient trough on the inner side of one lower edge receiving the points of the hooks, said trough being snapped over the points by a downward movement of the shield on the body, and spring means holding the trough upwardly against the points.

WALTER R. HAMMOCK.

REFERENCES CITED

The following references are of record in the file of this patent:

UNITED STATES PATENTS

| Number | Name | Date |
| --- | --- | --- |
| 1,489,471 | Tilton | Apr. 8, 1924 |
| 1,934,748 | Swanberg | Nov. 14, 1933 |
| 1,997,243 | Vanderhider et al. | Apr. 9, 1935 |
| 2,081,817 | Johnson | May 25, 1937 |
| 2,357,646 | Gilbert | Sept. 5, 1944 |